(12) United States Patent
Weiler et al.

(10) Patent No.: US 7,788,761 B2
(45) Date of Patent: Sep. 7, 2010

(54) DEVICE FOR SWINGING A WIPER ARM OF A WINDSCREEN WIPER ASSEMBLY AWAY FROM AND AGAINST A MOTOR VEHICLE WINDSCREEN

(75) Inventors: Michael Weiler, Chungchongbuk-Do (KR); Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 965 days.

(21) Appl. No.: 10/571,182

(22) PCT Filed: Jun. 2, 2004

(86) PCT No.: PCT/DE2004/001124

§ 371 (c)(1),
(2), (4) Date: Nov. 16, 2006

(87) PCT Pub. No.: WO2005/025955

PCT Pub. Date: Mar. 24, 2005

(65) Prior Publication Data

US 2007/0192985 A1    Aug. 23, 2007

(30) Foreign Application Priority Data

Sep. 9, 2003   (DE) .................................. 103 41 457

(51) Int. Cl.
*B60S 1/34* (2006.01)

(52) U.S. Cl. .............................. 15/250.351; 15/250.352
(58) Field of Classification Search ............ 15/250.351, 15/250.352, 250.19, 250.001
See application file for complete search history.

(56) References Cited

U.S. PATENT DOCUMENTS

| 3,387,316 A |   | 6/1968  | Pease          |            |
|-------------|---|---------|----------------|------------|
| 6,813,802 B2| * | 11/2004 | Buchanan, Jr.  | 15/250.351 |
| 6,857,160 B2| * | 2/2005  | Weiler et al.  | 15/250.351 |

FOREIGN PATENT DOCUMENTS

| DE | 100 52 616 | 5/2002 |
| EP | 0 299 708  | 1/1989 |
| EP | 0 728 640  | 8/1996 |
| JP | 2003-25962 | 1/2003 |

* cited by examiner

*Primary Examiner*—Gary K Graham
(74) *Attorney, Agent, or Firm*—Michael Best & Friedrich LLP

(57) ABSTRACT

Device (10) for swinging a wiper arm of a windshield wiper device away from and against a motor vehicle window, wherein the device (10) comprising at least two spring elements (11), which retain the wiper arm in a stable position away from the vehicle window and press the wiper arm against said vehicle window during the operation of the wipers, wherein at least one of the at least two spring elements (11) comprises at least one compressed region (13).

18 Claims, 3 Drawing Sheets

DEVICE FOR SWINGING A WIPER ARM OF A WINDSCREEN WIPER ASSEMBLY AWAY FROM AND AGAINST A MOTOR VEHICLE WINDSCREEN

BACKGROUND OF THE INVENTION

The invention relates to a device for swinging a wiper arm of a windshield wiper device away from and against a motor vehicle window, wherein said device comprising at least two spring elements, which retain the wiper arm in a stable position away from the vehicle window and press the wiper arm against said vehicle window during the operation of the wipers.

Non-articulated wiper arms, which are equipped with the device mentioned at the outset instead of articulation, are known form the prior art. In this case, a differentiation is made between essentially two designs. A first design has two spring elements arranged next to each other. The two spring elements are arranged with their one end in a V-shaped manner on a common one-piece connecting element. One portion of a two-part connecting element is respectively attached on the other end of one of the spring elements. During assembly, the spring elements that are arranged in a V-shape manner are pressed against each other, and the two parts of the two-part connecting element are fastened together via a fastening means, for example a rivet. Because the spring elements that are arranged vis-à-vis one another in a V-shaped manner are pressed together, a torsional force is generated in the spring elements. This torsional force also results in a swivel moment so that a wiper arm equipped with such a device is swung away from or against the window. What is disadvantageous with these devices known from the prior arm is that they are relatively expensive to install and have relatively high tool wear and material waste. In the case of a second design, three spring elements are arranged next to one another. In this case, either the center spring element is longer than the two outer ones or the two outer spring elements are longer than the center spring element. The three spring elements each have a common connecting element on their two ends, wherein one connecting element is connected as a single piece with the spring elements, and the second connecting element must be fastened to the spring elements in an extra assembly step. When the longer spring element is being fastened to the connecting element, the longer spring element must be bent. This bent spring element also results in a swivel moment so that a wiper arm equipped with this device can be swung away from the window or swung against it. This second design known from the prior art also has the disadvantage that it has a relatively high assembly expense and causes relatively high tool wear and material waste.

SUMMARY OF THE INVENTION

The objective of the invention is improving the device mentioned at the outset such that in the future assembly is simplified and tool wear and material waste are reduced.

The invention attains the stated objective via a device of the type mentioned at the outset in which, in accordance with the invention, at least one of the two spring elements has at least one compressed region. As a result, in the future the device can be punched out of sheet metal as a single part, wherein the spring elements are permanently connected on both ends to the connecting elements connecting the spring elements. Therefore, the spring elements now no longer must be fastened to the connecting element on one of their ends via the extra assembly that was previously required. In order to generate the swivel moment that is required for the device's function, at least one of the at least two spring elements is compressed in a selected region. In doing so, the extent of the compression determines the level of the desired swivel moment or the desired pressure force of the wiper arm against the vehicle window. The compressed regions are meaningfully situated at the end of the spring elements since greater stress occurs in the center of the spring elements because of the bending load. Since in the future the device will be punched as a single piece out of the sheet metal, and the spring elements no longer project in a V-shaped manner, in the future less material waste will be incurred. For that reason, material waste as well as tool wear is distinctly reduced.

In the case of a preferred embodiment, the device comprises two spring elements arranged next to one another, each of which is connected with one another on their end regions by connecting elements, wherein at least one end region of the device and at least one partial region of the connecting elements are compressed. As a result, the compression in at least one end region of the spring elements and in one partial region of the connecting elements generates a force, which attempts to spread the two spring elements. However, since the spring elements are permanently connected on their two ends to the connecting elements, a torsional force is generated in the spring elements, which in turn generates a swivel moment. As a result, it is possible to swivel a wiper arm equipped with the device into a stable position away from the vehicle window. If the wiper arm is swiveled from the swung-out position toward the window, it is swiveled over a critical point at which the swivel moment is turned in the opposite effective direction. Then the wiper arm equipped with the device in accordance with the invention is pressed against the window, thereby achieving optimum wiper performance.

In another embodiment of the device, the wiper arm comprises three spring elements arranged next to one another, wherein a center spring element is provided with at least one compressed end region. Alternatively, it is also possible for the wiper arm to have three spring elements arranged next to one another, wherein two externally arranged spring elements are provided with at least one compressed end region. It is also possible for the spring element that has the compressed end region to still have another second compressed end region in order to increase the swivel moment or the pressure force of the wiper arm on the vehicle window. Also in the case of this other embodiment, the device can be punched out of a sheet metal part, wherein the spring elements are permanently connected in their end regions to the connecting elements. The affected spring elements are elongated because of the compression process so that the compressed spring element or compressed spring elements impart the device with the required swivel moment in order to be able to swing the wiper arm provided with the device away from the window or against the vehicle window. Also in the case of this additional embodiment, there is a critical point between the position that is swung away from the window and the position of the wiper arm against the window. The effective direction of the swivel moment is reversed at this critical point.

The device can be expediently manufactured from sheet metal with a constant cross section. As a result, the device can be punched from a sheet metal band wrapped on a coil in a continuous fabrication process. For this reason, it is advantageous to manufacture the device in accordance with the invention in an automated fabrication process, in which the compressed regions are generated after a pre-punching process or after the punching process.

Exemplary embodiments of the device in accordance with the invention are explained in greater detail in the following on the basis of the enclosed drawings.

DETAILED DESCRIPTION

Figure 1:
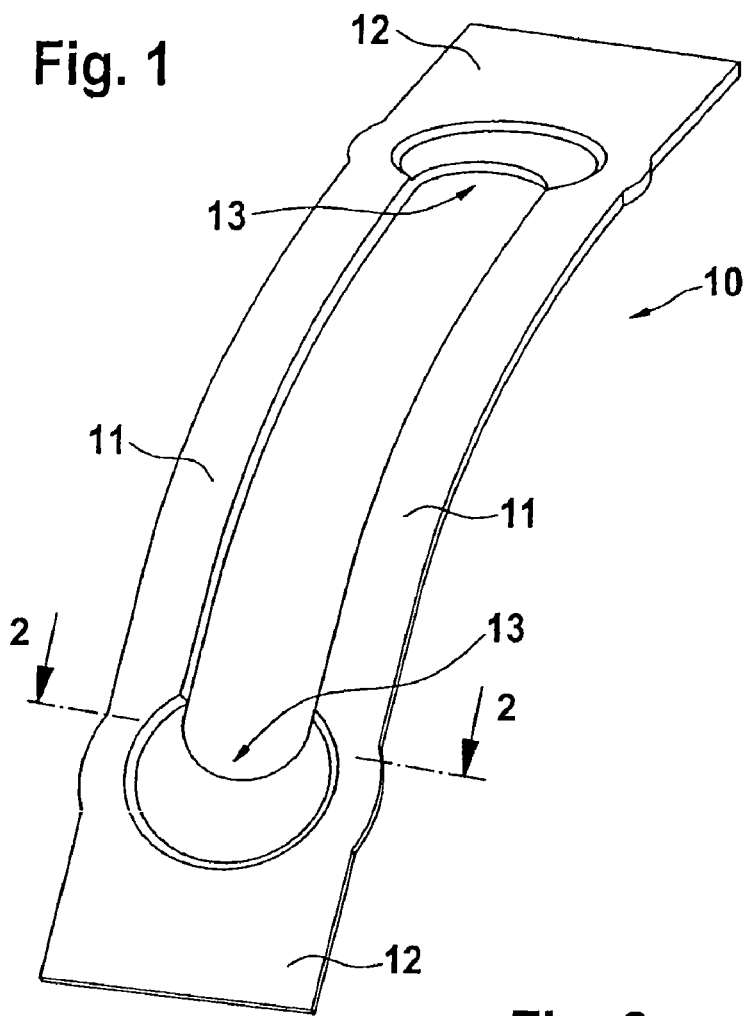
FIG. 1 a perspective view of a first embodiment of the device.
Figure 2:
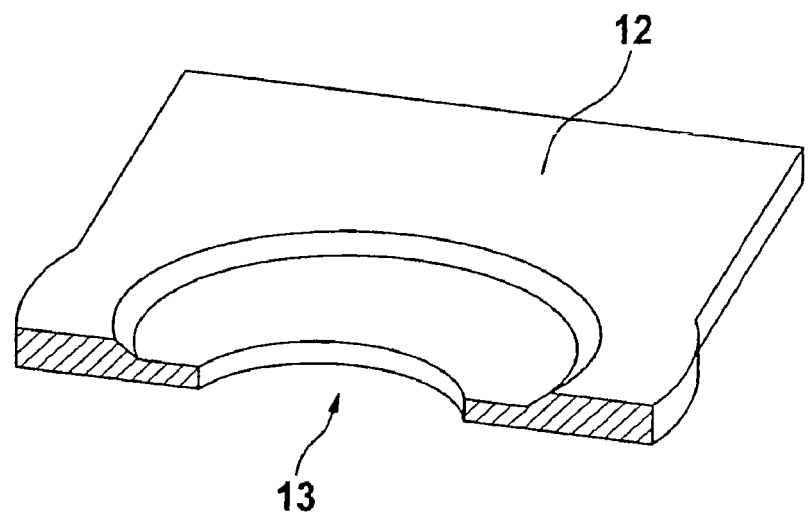
FIG. 2 a section of the device from FIG. 1 along Line 2-2.

FIG. 1 shows a device 10 of a wiper arm (not shown in detail here) of a windshield wiper device of a motor vehicle. The device 10 features two spring elements 11, each of which is connected with one another at connecting elements 12. The device 10 has a compressed region 13 in both its ends regions, in which an end region of the spring elements 11 and a partial region of the connecting elements 12 are respectively compressed (also see FIG. 2). Because of the compression in the end region 13, a spreading force is exerted on the spring elements 11, which attempts to spread the spring elements 11 in the end region 13 apart. However, since the spring elements 11 are permanently connected to the connecting elements 12, the spring elements 11 cannot spread apart so that they twist in order to yield to the spreading force. The torsional force acting in the spring elements 11 generates a swivel moment in the device 10, whereby a wiper arm provided with the device 10 can be swung away from a vehicle window or pressed against the vehicle window for wiper operation.

Figure 3:
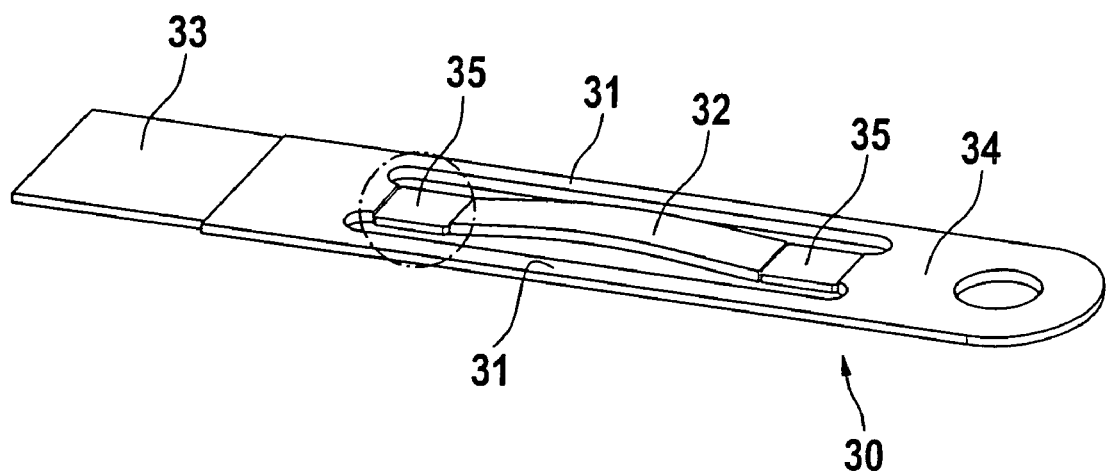
FIG. 3 a perspective view of a second embodiment of the device.
Figure 4:
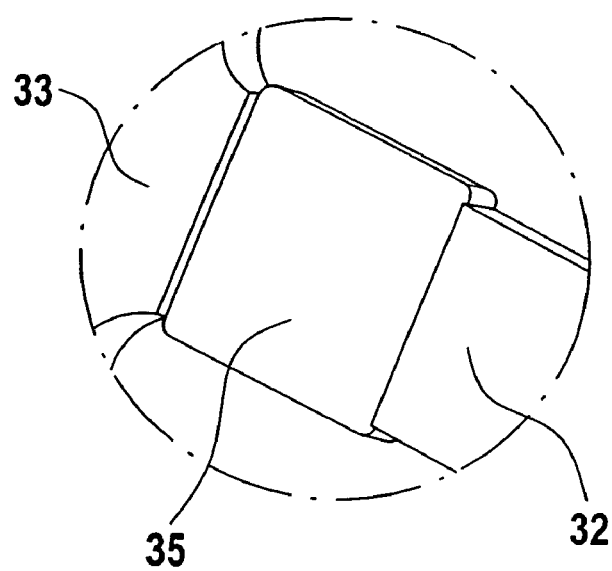
FIG. 4 a detailed view of a compressed region of the device from FIG. 3.

FIGS. 3 and 4 depict a device 30 with two spring elements 31 and one spring element 32. The spring elements 31 and 32 are connected with one another at a connecting element 33 and 34. The spring element 32 has a compressed region 35 at its ends. The spring element 32 experiences an elongation because of the compressed region 35. Since the elongated spring element 32 is permanently connected at both its ends to the connecting elements 33 and 34, the spring element 32 is bent by the elongation, and thereby imparts the device 30 with a swivel moment. Because of this swivel moment, a wiper arm equipped with the device 30 can be swung away from a vehicle window or swung against the vehicle window for wiper operation.

Figure 5:
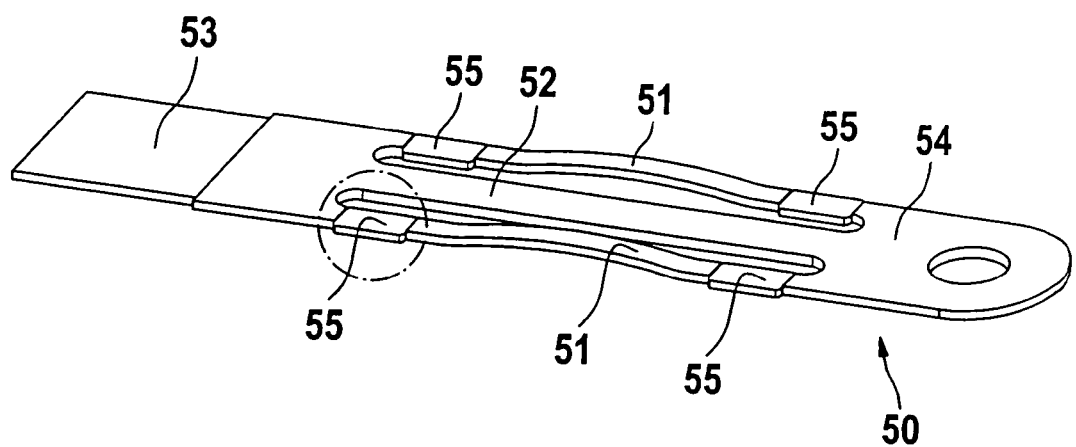
FIG. 5 a perspective view of a third embodiment of the device.
Figure 6:
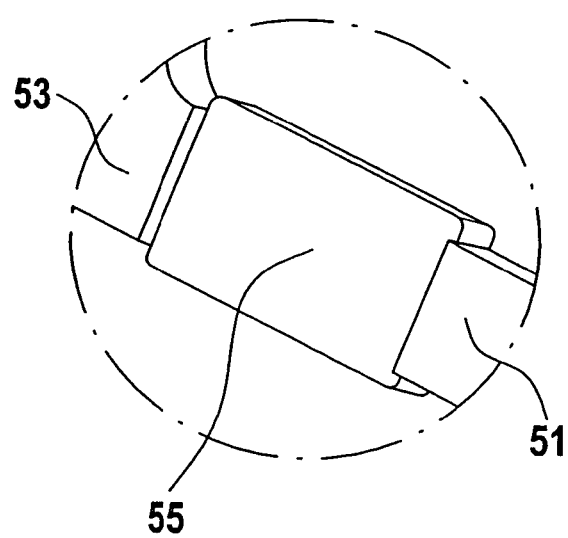
FIG. 6 a compressed region of the device from FIG. 5.

FIGS. 5 and 6 show a third embodiment of a device 50. The device 50 has spring elements 51 and 52, each of which is attached to connecting elements 53 and 54. The spring elements 51 have compressed regions 55 on their ends. Because of compressed regions 55, the spring elements 51 are elongated so that they are deflected and the device 50 is also imparted with a swivel moment. As a result, a wiper arm equipped with the device 50 can be swung away from the window or swung against the vehicle window for wiper operation.

The invention claimed is:

1. Device (30) for swinging a wiper arm of a windshield wiper device away from and against a motor vehicle window, the device comprising at least two spring elements, which retain the wiper arm in a stable position away from the vehicle window and press the wiper arm against said vehicle window during the operation of the wipers, wherein at least one of the at least two spring elements comprises at least one compressed region, characterized in that it comprises three spring elements (31, 32) arranged next to one another, wherein a center spring element (32) is provided with at least one compressed end region (35).

2. Device according to claim 1, characterized in that it can be manufactured from sheet metal with a constant cross section.

3. Device according to claim 1, characterized in that it can be manufactured automatically.

4. Device (50) for swinging a wiper arm of a windshield wiper device away from and against a motor vehicle window, the device comprising at least two spring elements, which retain the wiper arm in a stable position away from the vehicle window and press the wiper arm against said vehicle window during the operation of the wipers, wherein at least one of the at least two spring elements comprises at least one compressed region, characterized in that it comprises three spring elements (51, 52) arranged next to one another, wherein two externally arranged spring elements (51) are provided with at least one compressed end region (55).

5. Device according to claim 4, characterized in that it can be manufactured from sheet metal with a constant cross section.

6. Device according to claim 4, characterized in that it can be manufactured automatically.

7. Wiper arm for a windshield wiper device of a motor vehicle, comprising a device for swinging the wiper arm away from and against a window of the motor vehicle, wherein the device comprises at least two spring elements, which retain the wiper arm in a stable position away from the vehicle window and press the wiper arm against said vehicle window during the operation of the wipers, wherein at least one of the at least two spring elements comprises at least one compressed region, characterized in that the device (30) comprises three spring elements (31, 32) arranged next to one another, wherein a center spring element (32) is provided with at least one compressed end region (35).

8. Wiper arm according to claim 7, characterized in that the device can be manufactured from sheet metal with a constant cross section.

9. Wiper arm according to claim 7, characterized in that the device can be manufactured automatically.

10. Wiper arm for a windshield wiper device of a motor vehicle, comprising a device for swinging the wiper arm away from and against a window of the motor vehicle, wherein the device comprises at least two spring elements, which retain the wiper arm in a stable position away from the vehicle window and press the wiper arm against said vehicle window during the operation of the wipers, wherein at least one of the at least two spring elements comprises at least one compressed region, characterized in that the device (50) comprises three spring elements (51, 52) arranged next to one another, wherein two externally arranged spring elements (51) are provided with at least one compressed end region (55).

11. Wiper arm according to claim 10, characterized in that the device can be manufactured from sheet metal with a constant cross section.

12. Wiper arm according to claim 10, characterized in that the device can be manufactured automatically.

13. Windshield wiper for a motor vehicle, comprising at least one wiper arm with a device for swinging the wiper arm away from and against a window of the motor vehicle, wherein the device comprises at least two spring elements, which retain the wiper arm in a stable position away from the vehicle window and press the wiper arm against said vehicle window during the operation of the wipers, characterized in that at least one of the at least two spring elements comprises at least one compressed region, characterized in that the device (30) comprises three spring elements (31, 32) arranged next to one another, wherein a center spring element (32) is provided with at least one compressed end region (35).

14. Windshield wiper according to claim 13, characterized in that the device can be manufactured from sheet metal with a constant cross section.

15. Windshield wiper according to claim 13, characterized in that the device can be manufactured automatically.

16. Windshield wiper for a motor vehicle, comprising at least one wiper arm with a device for swinging the wiper arm away from and against a window of the motor vehicle, wherein the device comprises at least two spring elements, which retain the wiper arm in a stable position away from the vehicle window and press the wiper arm against said vehicle window during the operation of the wipers, characterized in that at least one of the at least two spring elements comprises at least one compressed region, characterized in that the device (50) comprises three spring elements (51, 52) arranged next to one another, wherein two externally arranged spring elements (51) are provided with at least one compressed end region (55).

17. Windshield wiper according to claim 16, characterized in that the device can be manufactured from sheet metal with a constant cross section.

18. Windshield wiper according to claim 16, characterized in that the device can be manufactured automatically.

* * * * *